(12) United States Patent
Dai et al.

(10) Patent No.: US 8,418,174 B2
(45) Date of Patent: Apr. 9, 2013

(54) ENHANCING THE SCALABILITY OF NETWORK CACHING CAPABILITY IN VIRTUALIZED ENVIRONMENT

(75) Inventors: David Z. Dai, Austin, TX (US); Rashmi Narasimhan, Roundrock, TX (US); Vasu Vallabhaneni, Austin, TX (US); Patrick T. Vo, Houston, TX (US)

(73) Assignee: International Business Machines Corporation, Armonk, NY (US)

( * ) Notice: Subject to any disclaimer, the term of this patent is extended or adjusted under 35 U.S.C. 154(b) by 1456 days.

(21) Appl. No.: 12/031,031

(22) Filed: Feb. 14, 2008

(65) Prior Publication Data

US 2009/0210872 A1    Aug. 20, 2009

(51) Int. Cl.
G06F 9/455 (2006.01)
G06F 9/46 (2006.01)
G06F 15/173 (2006.01)
G06F 15/16 (2006.01)

(52) U.S. Cl.
USPC ............... 718/1; 718/100; 709/238; 709/239; 709/243; 709/244; 709/245

(58) Field of Classification Search ................. None
See application file for complete search history.

(56) References Cited

U.S. PATENT DOCUMENTS

| | | | |
|---|---|---|---|
| 6,799,255 B1 * | 9/2004 | Blumenau et al. | 711/152 |
| 7,028,091 B1 * | 4/2006 | Tripathi et al. | 709/230 |
| 7,788,233 B1 * | 8/2010 | Iyer et al. | 707/661 |
| 7,925,711 B1 * | 4/2011 | Gopalan et al. | 709/212 |
| 7,979,509 B1 * | 7/2011 | Malmskog et al. | 709/219 |
| 2002/0152304 A1 * | 10/2002 | Collazo | 709/224 |
| 2004/0143608 A1 * | 7/2004 | Nakano et al. | 707/204 |
| 2005/0060704 A1 | 3/2005 | Bulson et al. | |
| 2006/0095690 A1 | 5/2006 | Craddock et al. | |
| 2006/0106585 A1 * | 5/2006 | Brown et al. | 703/1 |
| 2006/0123204 A1 | 6/2006 | Brown et al. | |
| 2006/0259730 A1 | 11/2006 | Gimpl et al. | |

OTHER PUBLICATIONS

Stetter et al. IBM eServer z990 improvements in firmware simulation. [online] (May 2004). IEEE, pp. 583-594. Retrieved From the Internet <http://ieeexplore.ieee.org/xpls/abs_all.jsp?arnumber=5388895&tag=1>.*

* cited by examiner

*Primary Examiner* — Emerson Puente
*Assistant Examiner* — Jonathan R Labud
(74) *Attorney, Agent, or Firm* — Stephen R. Tkacs; Stephen J. Walder, Jr.; Libby Z. Toub

(57) ABSTRACT

A mechanism is provided to enhance the scalability of network caching capabilities. All network client applications running on a partition in a virtualized environment are configured to query information from a single virtual input/output server (VIOS) network caching daemon. Thus, the illustrative embodiments provide a 1:n model where a VIOS partition has a network caching daemon, and each of the n partitions uses the network caching daemon of the VIOS partition. The mechanism of the illustrative embodiments only requires the system administrator to control one copy of the local files on the VIOS server. The system administrator does not need to monitor all of these local files on each individual partition. The system administrator consolidates the entries used by the different individual partitions into one single file on the VIOS server side.

21 Claims, 5 Drawing Sheets

ENHANCING THE SCALABILITY OF NETWORK CACHING CAPABILITY IN VIRTUALIZED ENVIRONMENT

BACKGROUND

1. Technical Field

The present application relates generally to an improved data processing system and method. More specifically, the present application is directed to a mechanism to enhance the scalability of network caching capability in a virtualized environment.

2. Description of Related Art

Transmission control protocol/Internet Protocol (TCP/IP) is a communications protocol developed under contract from the U.S. Department of Defense to inter-network dissimilar systems. A TCP/IP network application can use operating system (OS) provided network application program interfaces (APIs) to request information on a remote machine that runs the server application. This is referred to as a client/server architecture.

The operating system provided network APIs can support multiple map types, such as group, password, services, protocols, hosts, networks, and netgroup. For example, for the "hosts" map type, the operating system will provide APIs "gethostbyname" and "gethostbyaddr" to do host name to IP address mapping and IP address to host name mapping, respectively. This task is done by the resolver, which is the client part of a name service.

The resolver can be configured to get the information from different locations, such as a network information services (NIS) server, a domain name system (DNS) server, a lightweight directory access protocol (LDAP) server, or a local /etc/hosts file, for example.

If the resolver uses DNS, then for each API call (e.g., gethostbyname), the resolver sends the request over the network to a remote DNS server. The DNS server returns an answer. The time spent between resolver and DNS server over the network may become significant if the application makes a lot of API calls.

If the resolver uses a local file, then for each API call (e.g., gethostbyname), the resolver must parse the entire local /etc/hosts file to find the answer. If the /etc/hosts file is large, which happens on a lot of real customer systems, the resolver will take a long time to get the answer.

To solve this problem, operating system vendors provide a network caching daemon that runs on the client (resolver) side. The network caching daemon hashes all of the local file (e.g., /etc/group, /etc/passwd, /etc/services, /etc/protocols, /etc/hosts, /etc/networks, /etc/netgroup) entries into the network caching daemon so that the resolver does not do the linear search from the local file if it is configured to resolve the local way. The network caching daemon caches all of the positive and negative answers from the network server (e.g., NIS, NIS+, DNS, LDAP). The resolver may then query the network caching daemon first before going out on the network to query the network server if it is configured to use the non-local way.

The network caching daemon works well. However, the network caching daemon technique requires a 1:1 model. For each network client, there must be a network caching daemon running.

SUMMARY

The illustrative embodiments recognize the disadvantages of the prior art and provide a mechanism to enhance the scalability of network caching capabilities. All network client applications running on a partition in a virtualized environment are configured to query information from a single virtual input/output server (VIOS) network caching daemon. Thus, the illustrative embodiments provide a 1:n model where a VIOS partition has a network caching daemon, and each of the n partitions uses the network caching daemon of the VIOS partition. The mechanism of the illustrative embodiments only requires the system administrator to control one copy of the local files on the VIOS server. The system administrator does not need to monitor all of these local files on each individual partition. The system administrator consolidates the entries used by the different individual partitions into one single file on the VIOS server side.

In one illustrative embodiment, a method for network caching in a virtualized environment comprises configuring a first partition within a plurality of partitions in a virtualized environment with a network caching daemon, configuring a second partition within the plurality of partitions within the virtualized environment with an address of the network caching daemon, and responsive to a request to resolve a host from a network application running in the second partition, sending the request to the address of the network caching daemon through a virtualization layer.

In one exemplary embodiment, the network caching daemon hashes entries from local file. In a further exemplary embodiment, the local file consolidates all the local files of the plurality of partitions. In another exemplary embodiment, the method further comprises if the second partition is configured to resolve the host a local way, hashing, by the network caching daemon, the local file.

In another exemplary embodiment, the method further comprises if the second partition is configured to resolve the host a non-local way, searching, by the network caching daemon, answers in a cache file, and if the answer appears in the cache file, returning the answer to the second partition. In a further exemplary embodiment, the method further comprises if the answer does not appear in the cache file, sending a request from the network caching daemon to a server through a network layer, and caching an answer from the server in the cache file.

In yet another exemplary embodiment, the first partition is a virtual input/output server partition.

In still another exemplary embodiment, the first partition and the second partition run on separate computer systems within a subnet.

In another illustrative embodiment, a data processing system comprises a plurality of partitions running in a virtualized environment within the data processing system and a virtualization layer. A first partition within the plurality of partitions is configured with a network caching daemon. A second partition within the plurality of partitions is configured with an address of the network caching daemon. Responsive to a request to resolve a host from a network application running in the second partition, the second partition sends the request to the address of the network caching daemon through the virtualization layer.

In one exemplary embodiment, the network caching daemon hashes entries from local file. In a further exemplary embodiment, the local file consolidates all the local files of the plurality of partitions. In another exemplary embodiment, if the second partition is configured to resolve the host a local way, the network caching daemon hashes the local file.

In another exemplary embodiment, if the second partition is configured to resolve the host a non-local way, the network caching daemon searches answers in a cache file. If the answer appears in the cache file, the network caching daemon returns the answer to the second partition. In a further exemplary embodiment, if the answer does not appear in the cache file, the network caching daemon sends a request to a server through a network layer and caches an answer from the server in the cache file.

In yet another exemplary embodiment, the first partition is a virtual input/output server partition.

In a further illustrative embodiment, a computer program product comprises a computer useable medium having a computer readable program. The computer readable program, when executed on a computing device, causes the computing device to configure a first partition within a plurality of partitions in a virtualized environment with a network caching daemon, configure a second partition within the plurality of partitions within the virtualized environment with an address of the network caching daemon, and responsive to a request to resolve a host from a network application running in the second partition, send the request to the address of the network caching daemon through a virtualization layer.

In one exemplary embodiment, the network caching daemon hashes entries from local file, and if the second partition is configured to resolve the host a local way, hashing, by the network caching daemon, the local file.

In another exemplary embodiment, the computer readable program, when executed on a computing device, causes the computing device if the second partition is configured to resolve the host a non-local way, search, by the network caching daemon, answers in a cache file, and if the answer appears in the cache file, return the answer to the second partition.

In still another exemplary embodiment, the computer readable program comprises instructions that are stored in a computer readable storage medium in a data processing system, and wherein the instructions were downloaded over a network from a remote data processing system.

In yet another exemplary embodiment, the computer readable program comprises instructions that are stored in a computer readable storage medium in a server data processing system, and wherein the instructions are downloaded over a network to a remote data processing system for use in a computer readable storage medium with the remote data processing system.

These and other features and advantages of the present invention will be described in, or will become apparent to those of ordinary skill in the art in view of, the following detailed description of the exemplary embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION OF THE ILLUSTRATIVE EMBODIMENTS

Figure 1:
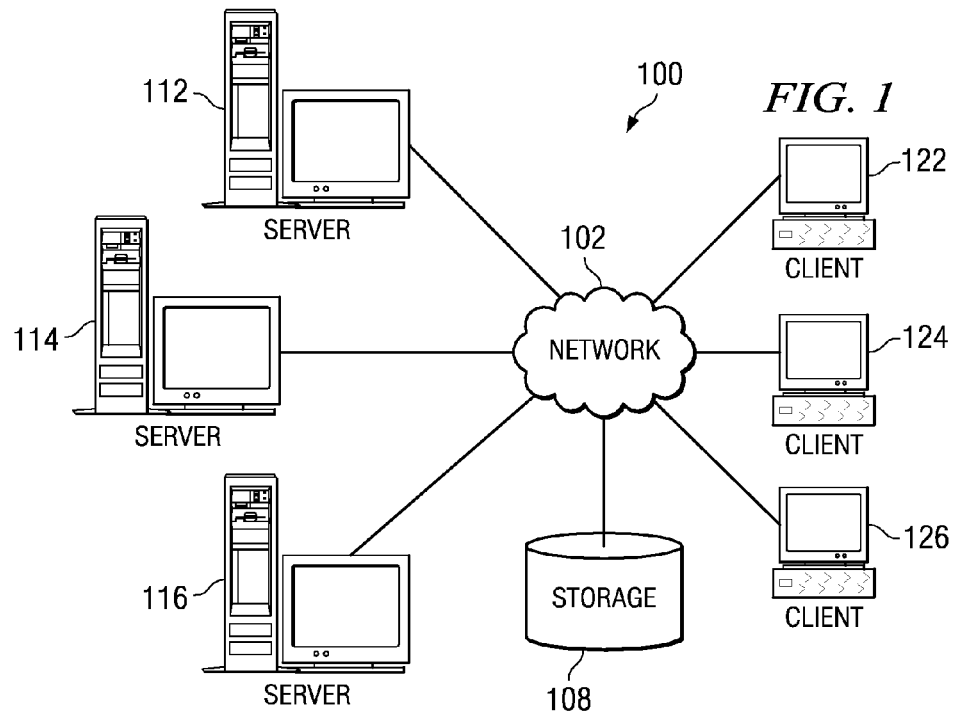
FIG. 1 is an exemplary representation of an exemplary distributed data processing system in which aspects of the illustrative embodiments may be implemented.
Figure 2:
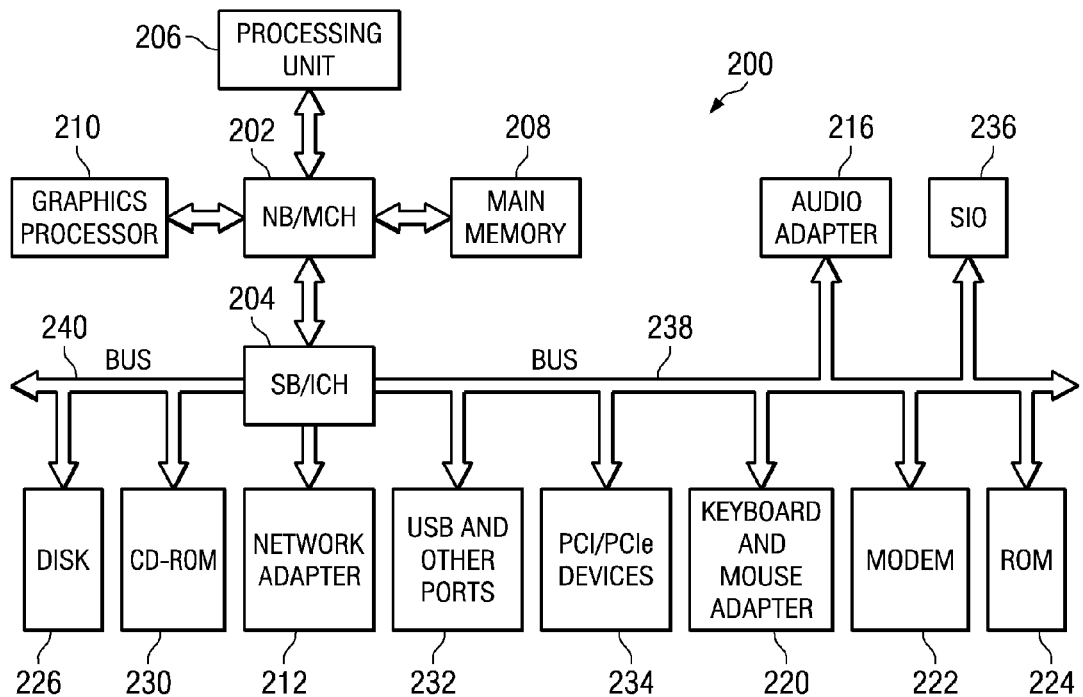
FIG. 2 is a block diagram of an exemplary data processing system in which aspects of the illustrative embodiments may be implemented.

With reference now to the figures and in particular with reference to FIGS. 1 and 2, exemplary diagrams of data processing environments are provided in which illustrative embodiments of the present invention may be implemented. It should be appreciated that FIGS. 1 and 2 are only exemplary and are not intended to assert or imply any limitation with regard to the environments in which aspects or embodiments of the present invention may be implemented. Many modifications to the depicted environments may be made without departing from the spirit and scope of the present invention.

With reference now to the figures, FIG. 1 depicts a pictorial representation of an exemplary distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, servers 112, 114, and 116 are connected to network 102 along with storage unit 108. In addition, clients 122, 124, and 126 are also connected to network 102. These clients 122, 124, and 126 may be, for example, personal computers, network computers, or the like. In the depicted example, server 112 provides data, such as boot files, operating system images, and applications to the clients 122, 124, and 126. Clients 122, 124, and 126 are clients to server 112 in the depicted example. Distributed data processing system 100 may include additional servers, clients, and other devices not shown.

In one illustrative embodiment, one or more of clients 122, 124, 126 and servers 112, 114, 116 may run a virtualized environment, such as AIX® logical partitioning (LPAR). In one exemplary embodiment, a client or server running a virtualized environment has one virtual input/output server (VIOS) partition that controls all of the resources. A single network caching daemon is provided in the VIOS partition. At the VIOS side, the network caching daemon consolidates the entries in each local file (e.g., /etc/passwd, /etc/hosts, etc.) so that this information can be shared by all of the individual partitions. The system administrator configures the network interface at the VIOS side and starts the network caching daemon, which listens on the network interface. The network caching daemon may listen on a well known port number and hashes all of the local files into its cache.

On each individual partition side, the system administrator may configure the operating system with the network caching daemon Internet protocol (IP) address and the server port number (if not the default well known port number) so the resolver knows where to send the request. For example, a user may specify the IP address and server port number information in a text configuration file. The resolver side code may be modified to hold the network caching daemon server IP address and port number. All of the existing network applications need not be modified or recompiled. Even though the IP address appears to be a remote IP address, the resolver actually communicates with the same system through the virtualization layer. The query is not sent out on the network unless a response is not cached in the network caching daemon.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

With reference now to FIG. 2, a block diagram of an exemplary data processing system is shown in which aspects of the illustrative embodiments may be implemented. Data processing system 200 is an example of a computer, such as host 112 in FIG. 1, in which computer usable code or instructions implementing the processes for illustrative embodiments of the present invention may be located.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft® Windows® XP (Microsoft and Windows are trademarks of Microsoft Corporation in the United States, other countries, or both). An object-oriented programming system, such as the Java™ programming system, may run in conjunction with the operating system and provides calls to the operating system from Java™ programs or applications executing on data processing system 200 (Java is a trademark of Sun Microsystems, Inc. in the United States, other countries, or both).

As a server, data processing system 200 may be, for example, an IBM® eServer™ System p® computer system, running the Advanced Interactive Executive (AIX®) operating system or the LINUX® operating system (eServer, System p and AIX are trademarks of International Business Machines Corporation in the United States, other countries, or both while LINUX is a trademark of Linus Torvalds in the United States, other countries, or both). Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device which is configured with flash memory to provide non-volatile memory for storing operating system files and/or user-generated data, for example. Essentially, data processing system 200 may be any known or later developed data processing system without architectural limitation.

Figure 3:
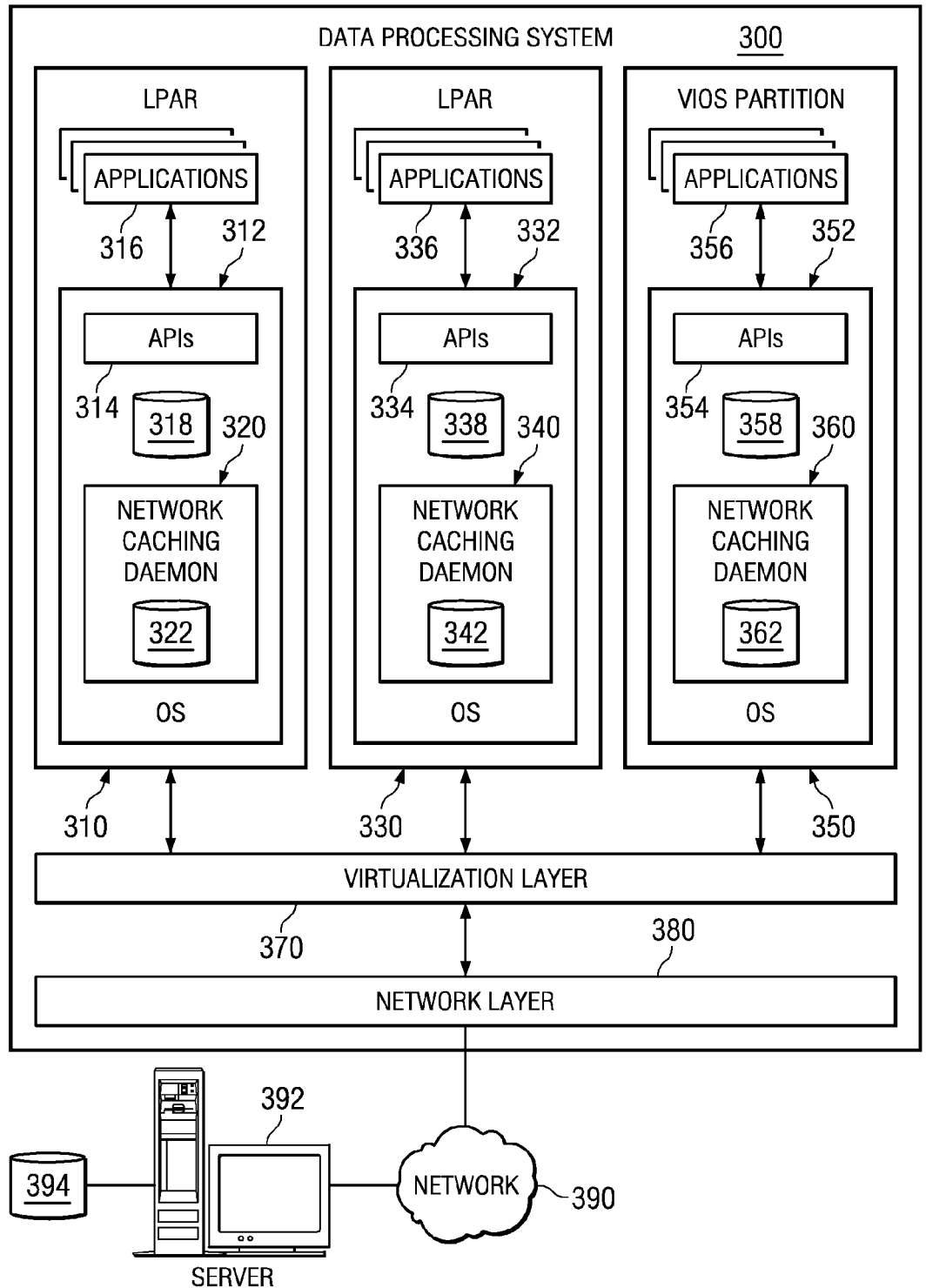
FIG. 3 is a block diagram illustrating a data processing system with a virtualized environment in accordance with an illustrative embodiment.

FIG. 3 is a block diagram illustrating a data processing system with a virtualized environment in accordance with an illustrative embodiment. Data processing system 300 has a plurality of logical partitions (LPARs) 310, 330, 350. LPAR 310 has an instance of an operating system 312 with a set of application programming interfaces (APIs) 314 and one or more applications 316 running. LPAR 330 has operating system 332 with APIs 334 and one or more applications 336. LPAR 350 is a virtual input/output server (VIOS) partition and has operating system 352 with APIs 354 and one or more applications 356 running. LPAR 350 may be VIOS partition by virtue of applications 356 including VIOS software.

LPARs 310, 330, and 350 may communicate with one another through virtualization layer 370. Virtualization layer 370 is software that performs communications and resource management to allow multiple instances of operating systems 312, 332, 352 to run on data processing system 300 at the same time. Virtualization layer 370 performs tasks such as processor timeslice sharing, memory allocation, and the like. Virtualization layer 370 may be, for example, a hypervisor.

Applications 316, 336, and 356 may include network applications that communicate with devices on network 390. When communicating with network 390 applications 316, 336, and 356 make calls to APIs 314, 334, 354, and operating system 312 communicates through virtualization layer 370 and network layer 380 to network 390. Network layer 380 is software that performs tasks for network communication. Network layer 380 may perform tasks such as end-to-end packet delivery, quality of service maintenance, error control, and the like.

A transmission control protocol/Internet protocol (TCP/IP) network application, such as application 316 for example, can make a call to APIs 314 to request information on a server, which may run a server application. Operating system 312, for instance, may provide multiple map types, such as group, password, services, protocols, hosts, networks, and netgroup. For example, for the "hosts" map type, operating system 312 may provide within APIs 314 "gethostbyname" and "gethostbyaddr" methods to do the host name to IP address mapping and IP address to host name mapping. This task is done by the resolver, i.e. the network application.

The resolver may be configured to get the information from different locations, such as server 392, which may be a network information services (NIS) server, a domain name system (DNS) server, or a lightweight directory access protocol (LDAP) server. Alternatively, the resolver can get the information from a local /etc/hosts file, such as file 318 for example. LPAR 330 has local file 338 and VIOS partition has local file 358.

If the resolver uses DNS, for example, then for each API call (e.g., gethostbyname), the resolver will send the request over network 390 to server 392. Server 392 then looks up the answer in storage 394 and returns the answer to the resolver. The time spent between resolver, such as one of applications 316, and server 392 over network 390 may be significant, particularly if the application makes a lot of API calls.

If the resolver uses the local method, then for each API call (e.g., gethostbyname), the OS must parse the entire /etc/hosts file within local file 318 to get the answer. If the /etc/hosts file is significantly large, as is the case with many real customer systems, it may take a long time for the resolver to get the answer.

To solve this problem, in one illustrative embodiment, operating system vendors may provide network caching daemons 320, 340, 360 that run on the client (resolver) side in LPARs 310, 330, 350. Network caching daemons 320, 340, 360 hash entries from local files 318, 338, 358 so that the resolver will not do the local search from local files 318, 338, 358 if it is configured to resolve the host name or IP address the local way. Having network caching daemons 320, 340, 360 hash local files 318, 338, 358 reduces the time to get an answer because the OS does not have to parse the entire file for each API call.

Each one of network caching daemons 320, 340, 360 caches positive and negative answers from server 392 into its respective cache file 322, 342, 362. The resolver then queries the network caching daemon first before it goes out to query server 392 over network 390 if the resolver is configured to resolve the host name or IP address the non-local way.

The network caching daemon works well. However, the network caching daemon technique requires a 1:1 model. For each network client, there must be a network caching daemon running.

Figure 4:
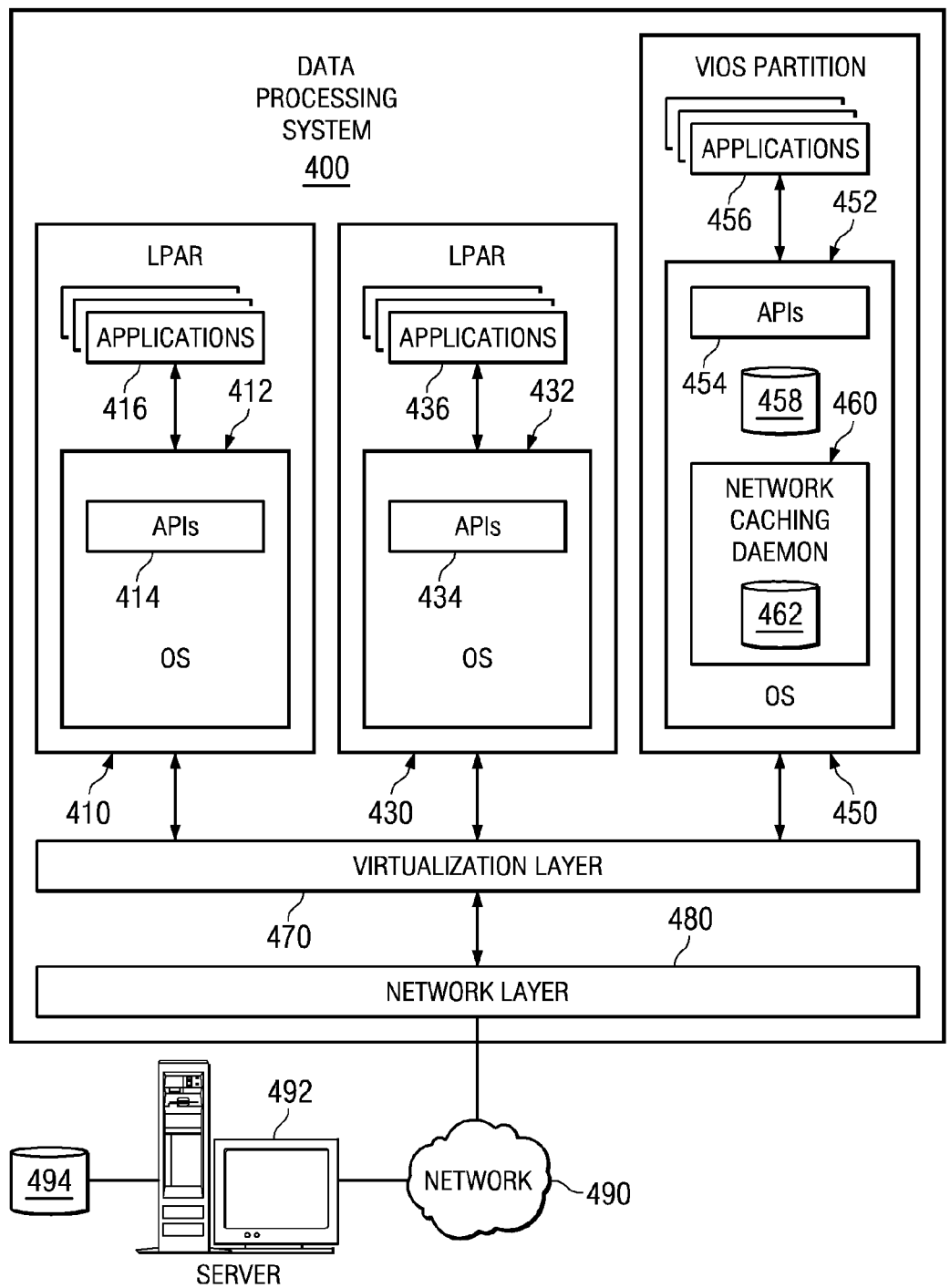
FIG. 4 is a block diagram illustrating a data processing system with a mechanism to enhance the scalability of network caching in a virtualized environment in accordance with an illustrative embodiment.

FIG. 4 is a block diagram illustrating a data processing system with a mechanism to enhance the scalability of network caching in a virtualized environment in accordance with an illustrative embodiment. Data processing system 400 has a plurality of logical partitions (LPARs) 410, 430, 450. LPAR 410 has an instance of an operating system 412 with a set of application programming interfaces (APIs) 414 and one or more applications 416 running. LPAR 430 has operating system 432 with APIs 434 and one or more applications 436. LPAR 450 is a virtual input/output server (VIOS) partition and has operating system 452 with APIs 454 and one or more applications 456 running. LPAR 450 may be VIOS partition by virtue of applications 456 including VIOS software.

LPARs 410, 430, and 450 may communicate with one another through virtualization layer 470. Virtualization layer 470 is software that performs communications and resource management to allow multiple instances of operating systems 412, 432, 452 to run on data processing system 400 at the same time. Virtualization layer 470 performs tasks such as processor timeslice sharing, memory allocation, and the like. Virtualization layer 470 may be, for example, a hypervisor.

Applications 416, 436, and 456 may include network applications that communicate with devices on network 490. When communicating with network 490 applications 416, 436, and 456 make calls to APIs 414, 434, 454, and operating system 412 communicates through virtualization layer 470 and network layer 480 to network 490. Network layer 480 is software that performs tasks for network communication. Network layer 480 may perform tasks such as end-to-end packet delivery, quality of service maintenance, error control, and the like.

A transmission control protocol/Internet protocol (TCP/IP) network application, such as application 416 for example, can make a call to APIs 414 to request information on a server, which may run a server application. Operating system 412, for instance, may provide multiple map types, such as group, password, services, protocols, hosts, networks, and netgroup. For example, for the "hosts" map type, operating system 412 may provide within APIs 414 "gethostbyname" and "gethostbyaddr" methods to do the host name to IP address mapping and IP address to host name mapping. This task is done by the resolver, i.e. the network application.

The resolver may be configured to get the information from different locations, such as server 492, which may be a network information services (NIS) server, a domain name system (DNS) server, or a lightweight directory access protocol (LDAP) server. Alternatively, the resolver can get the information from a local /etc/hosts file, such as file 458 for example in the VIOS partition 450.

If the resolver uses DNS, for example, then for each API call (e.g., gethostbyname), the resolver will send the request over network 490 to server 492. Server 492 then looks up the answer in storage 494 and returns the answer to the resolver. The time spent between resolver, such as one of applications 416, and server 492 over network 490 may be significant, particularly if the application makes a lot of API calls.

If the resolver uses the local method, then for each API call (e.g., gethostbyname), the OS must parse the entire /etc/hosts file within local file 458 to get the answer. If the /etc/hosts file is significantly large, as is the case with many real customer systems, it may take a long time for the resolver to get the answer.

In the illustrative embodiment, the system administrator may provide network caching daemon 460 that runs on the client (resolver) side in VIOS LPAR 450. Network caching daemon 460 hashes entries from local file 458 so that the resolver will not do the local search from local files 458 if it is configured to resolve the host name or IP address the local way. Having network caching daemon 460 hash local file 458 reduces the time to get an answer because the OS does not have to parse the entire file for each API call.

Network caching daemon 460 caches positive and negative answers from server 492 into cache file 462. The resolver then queries the network caching daemon 460 first before it goes out to query server 492 over network 490 if the resolver is configured to resolve the host name or IP address the non-local way.

On the VIOS side, local file 458 consolidates all the local files, such as /etc/passwd, /etc/hosts, etc, so that local file 458 can be shared by all of the individual LPAR 410, 430, 450. The system administrator may configure the network interface (not shown), start network caching daemon 460, and configure network caching daemon 460 to listen on the network interface (e.g., a valid IP address). Network caching daemon 460 may listen on a well known port number. Network caching daemon 460 may also hash all of the local files into cache 462.

On each individual LPAR side, the system administrator configures operating systems 412, 432, 452 with the IP address of network caching daemon 460 and the server port number, if not the well known port number, so that the resolver knows where to send the requests. For example, the system administrator may specify the IP address of network caching daemon 460 and the server port number in a local text configuration file. The resolver side code may be modified to hold the network caching daemon 460 server IP address and port number. All of the existing network applications need not be modified or recompiled. Even though the IP address appears to be a remote IP address, the resolver actually communicates with the same system through virtualization layer 470. The query is not sent out on network 490 unless a response is not cached in network caching daemon 460.

Figure 5:
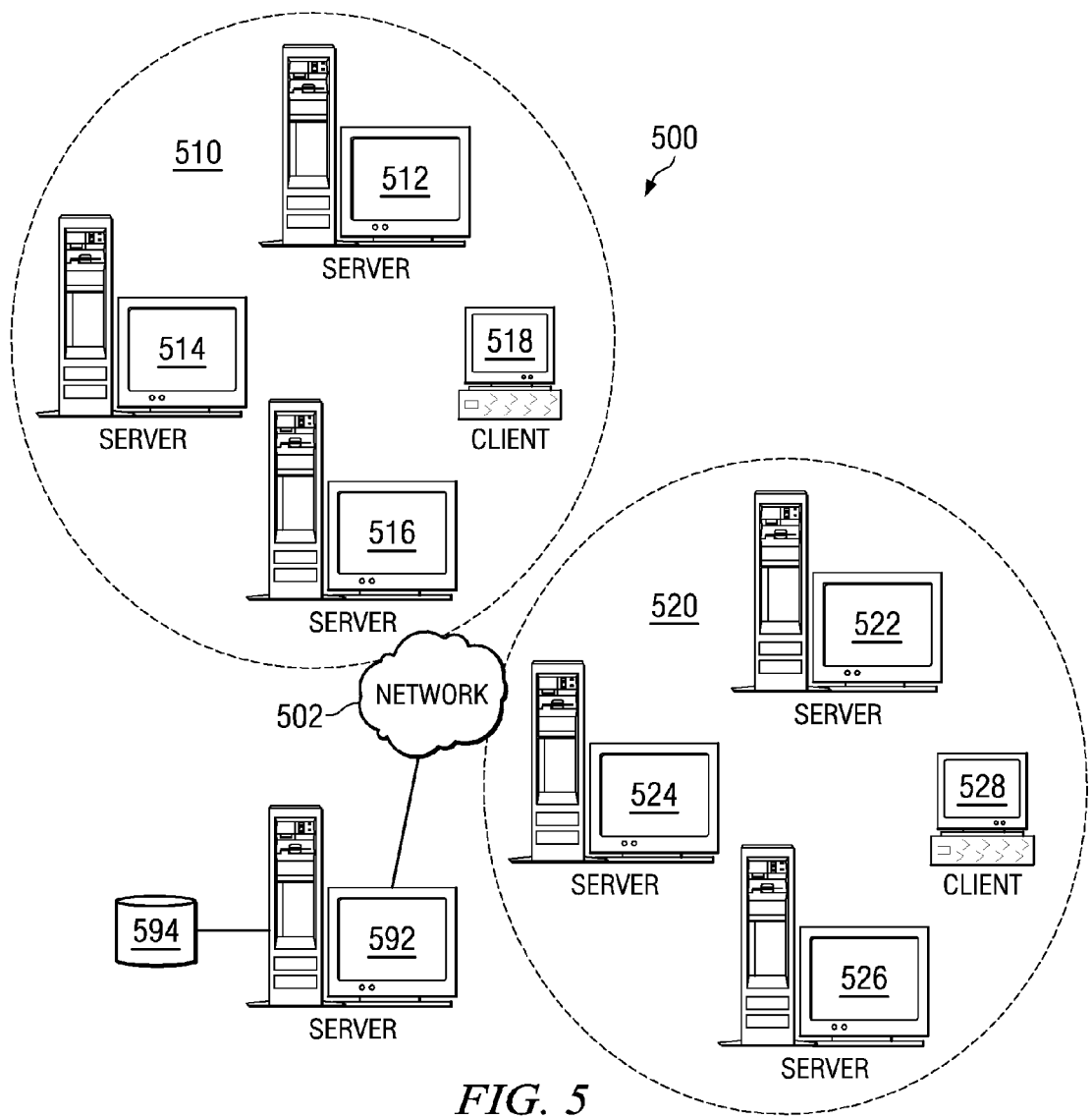
FIG. 5 depicts a pictorial representation of an exemplary distributed data processing system with a mechanism to enhance the scalability of network caching in accordance with the illustrative embodiment.

FIG. 5 depicts a pictorial representation of an exemplary distributed data processing system with a mechanism to enhance the scalability of network caching in accordance with the illustrative embodiment. Distributed data processing system 500 may include a network of computers in which aspects of the illustrative embodiments may be implemented. The distributed data processing system 500 contains at least one network 502, which is the medium used to provide communication links between various devices and computers connected together within distributed data processing system 500. The network 502 may include connections, such as wire, wireless communication links, or fiber optic cables.

In the depicted example, servers 512, 514, 516, 522, 524, and 526 are connected to network 502 along with clients 518, 528. Distributed data processing system 500 may include additional servers, clients, and other devices not shown. Servers 512-516 and client 518 belong to subnet 510. Servers 522-526 and client 528 belong to subnet 520.

The resolver may be configured to get the information from different locations, such as server 592, which may be a network information services (NIS) server, a domain name system (DNS) server, or a lightweight directory access protocol (LDAP) server. Alternatively, the resolver can get the information from a local /etc/hosts file. If the resolver uses DNS, for example, then for each API call (e.g., gethostbyname), the resolver will send the request over network 502 to server 592. Server 592 then looks up the answer in storage 594 and returns the answer to the resolver. The time spent between resolver and server 592 over network 502 may be significant, particularly if the application makes a lot of API calls. If the resolver uses the local method, then for each API call (e.g., gethostbyname), the OS must parse the entire /etc/hosts file to get the answer. If the /etc/hosts file is significantly large, as is the case with many real customer systems, it may take a long time for the resolver to get the answer.

In one illustrative embodiment, one of the computing systems within servers 512-516 and client 518, for example, may run a network caching daemon such that one instance of the network caching daemon runs in each subnet 510, 520. Each partition running in each of the computing systems may then be configured with the IP address and port number of the network caching daemon of its subnet.

For instance, server 516 in subnet 510 may run a network caching daemon. Each of the computing systems within 510 may then be configured with the IP address and port number of the network caching daemon of the respective subnet. The network caching daemon may then consolidate the local files of each of the computing systems within the subnet. The network caching daemon may also cache positive and negative answers in a local cache file.

Figure 6:
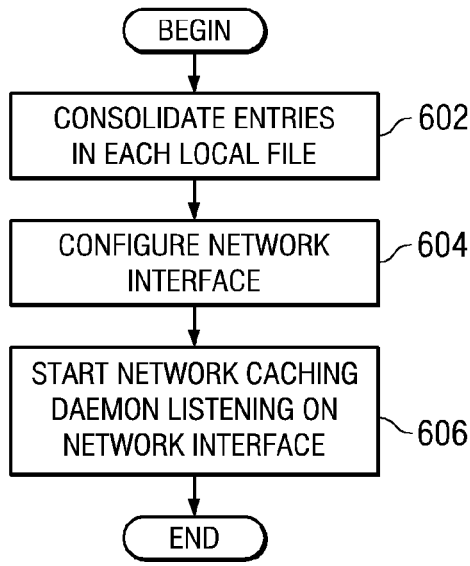
FIG. 6 is a flowchart illustrating configuration of a virtual input/output server to enhance the scalability of network caching capability in a virtualized environment in accordance with an illustrative embodiment.

FIG. 6 is a flowchart illustrating configuration of a virtual input/output server to enhance the scalability of network caching capability in a virtualized environment in accordance with an illustrative embodiment. It will be understood that each block of the flowchart illustrations, and combinations of blocks in the flowchart illustrations, can be implemented by computer program instructions. These computer program instructions may be provided to a processor or other programmable data processing apparatus to produce a machine, such that the instructions which execute on the processor or other programmable data processing apparatus create means for implementing the functions specified in the flowchart block or blocks. These computer program instructions may also be stored in a computer-readable memory or storage medium that can direct a processor or other programmable data processing apparatus to function in a particular manner, such that the instructions stored in the computer-readable memory or storage medium produce an article of manufacture including instruction means which implement the functions specified in the flowchart block or blocks.

Accordingly, blocks of the flowchart illustrations support combinations of means for performing the specified functions, combinations of steps for performing the specified functions and program instruction means for performing the specified functions. It will also be understood that each block of the flowchart illustrations, and combinations of blocks in the flowchart illustrations, can be implemented by special purpose hardware-based computer systems which perform the specified functions or steps, or by combinations of special purpose hardware and computer instructions.

With reference now to FIG. 6, operation begins and the system administrator consolidates the entries in each local file within the virtual environment into one local file associated with the network caching daemon (block 602). Then, the system administrator configures the network interface (block 604). The system administrator then starts the network caching daemon listening on the network interface (block 606). The network caching daemon may listen on a well known port number. Thereafter, operation ends.

Figure 7:
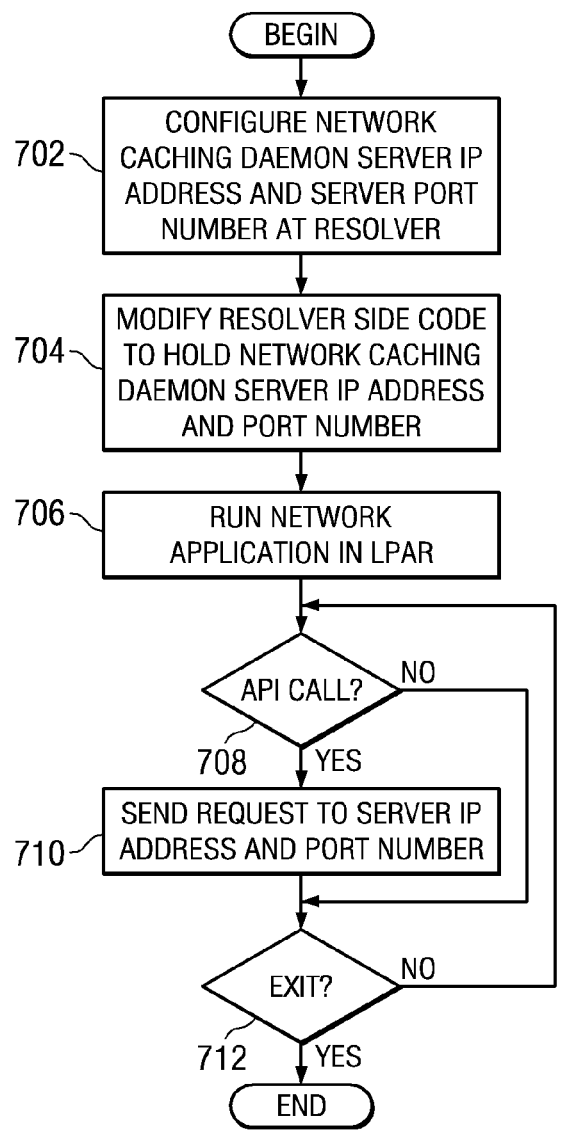
FIG. 7 is a flowchart illustrating configuration of a virtual input/output server to enhance the scalability of network caching capability in a virtualized environment in accordance with an illustrative embodiment.

FIG. 7 is a flowchart illustrating configuration of a virtual input/output server to enhance the scalability of network caching capability in a virtualized environment in accordance with an illustrative embodiment. Operation begins, and the system administrator configures each partition with the IP address and server port number of the network caching daemon at the resolver (block 702). Next, the system administrator modifies the resolver side code to hold the network caching daemon server IP address and port number (block 704). Then, the system administrator runs one or more network applications in one or more logical partitions (LPARa) (block 706).

The resolver side code determines whether there is a network application programming interface (API) call (block 708). If a network application makes an API call, such as gethostbyname or gethostbyaddr for example, then the operating system sends the request to the server IP address and port number of the network caching daemon (block 710). Thereafter, or if a network application does not make an resolver related API call in block 708, then application determines whether an exit condition exists(block 712). An exit condition may exist, for example, if the data processing system is being shut down. If an exit condition exists, operation ends. If an exit condition does not exist in block 712, operation returns to block 708 to determine whether a network application makes an API call.

Thus, the illustrative embodiments solve the disadvantages of the prior art by providing a mechanism to enhance the scalability of network caching capabilities. All network client applications running on a partition in a virtualized environment are configured to query information from a single virtual input/output server (VIOS) network caching daemon. Thus, the illustrative embodiments provide a 1:n model where a VIOS partition has a network caching daemon, and each of the n partitions uses the network caching daemon of the VIOS partition. The mechanism of the illustrative embodiments only requires the system administrator to control one copy of the local files on the VIOS server. The system administrator does not need to monitor all of these local files on each individual partition. The system administrator consolidates the entries used by the different individual partitions into one single file on the VIOS server side.

It should be appreciated that the illustrative embodiments may take the form of a specialized hardware embodiment, a software embodiment that is executed on a computer system having general processing hardware, or an embodiment containing both specialized hardware and software elements that are executed on a computer system having general processing hardware. In one exemplary embodiment, the mechanisms of the illustrative embodiments are implemented in a software product, which may include but is not limited to firmware, resident software, microcode, etc.

Furthermore, the illustrative embodiments may take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

The medium may be an electronic, magnetic, optical, electromagnetic, or semiconductor system, apparatus, or device. Examples of a computer-readable medium include a semiconductor or solid state memory, magnetic tape, a removable computer diskette, a random access memory (RAM), a read-only memory (ROM), a rigid magnetic disk, and an optical disk. Current examples of optical disks include compact disk-read-only memory (CD-ROM), compact disk-read/write (CD-R/W) and DVD.

The program code of the computer program product may comprise instructions that are stored in a computer readable storage medium in a client or server data processing system. In a client data processing system embodiment, the instructions may have been downloaded over a network from one or more remote data processing systems, such as a server data processing system, a client data processing system, or a plurality of client data processing systems using a peer-to-peer communication methodology. In a server data processing system embodiment, the instructions may be configured for download, or actually downloaded, over a network to a remote data processing system, e.g., a client data processing system, for use in a computer readable storage medium with the remote data processing system.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for network caching in a virtualized environment, the method comprising:
configuring a first logical partition within a plurality of logical partitions in a virtualized environment with a network caching daemon;
configuring a second logical partition within the plurality of logical partitions within the virtualized environment with an address of the network caching daemon; and
responsive to a request to resolve a host from a network application running in the second logical partition, sending the request to the address of the network caching daemon through a virtualization layer, wherein the request to resolve a host comprises a request to do a host name to Internet protocol address mapping or a request to do an Internet protocol address to host name mapping and wherein the network caching daemon caches host name to Internet protocol address mappings.

2. The method of claim 1, wherein the network caching daemon hashes entries from a local file that stores host name to Internet protocol address mappings for the virtualized environment.

3. The method of claim 2, wherein the local file consolidates all local files of the plurality of logical partitions.

4. The method of claim 2, further comprising:
if the second logical partition is configured to resolve the host a local way, hashing, by the network caching daemon, the local file.

5. The method of claim 1, further comprising:
if the second logical partition is configured to resolve the host a non-local way, searching, by the network caching daemon, answers in a cache file; and
if the answer appears in the cache file, returning the answer to the logical second partition.

6. The method of claim 5, further comprising:
if the answer does not appear in the cache file, sending a request from the network caching daemon to a server through a network layer; and
caching an answer from the server in the cache file.

7. The method of claim 1, wherein the first logical partition is a virtual input/output server logical partition.

8. The method of claim 1, wherein the first logical partition and the second logical partition run on separate computer systems within a subnet.

9. A data processing system, comprising:
at least one processing unit;
a main memory coupled to the at least one processing unit;
a plurality of logical partitions running in a virtualized environment within the data processing system implemented using the at least one processing unit and the main memory; and
a virtualization layer,
wherein a first logical partition within the plurality of logical partitions is configured with a network caching daemon;
wherein a second logical partition within the plurality of logical partitions is configured with an address of the network caching daemon;
wherein responsive to a request to resolve a host from a network application running in the second logical partition, the second logical partition sends the request to the address of the network caching daemon through the virtualization layer;
wherein the request to resolve a host comprises a request to do a host name to Internet protocol address mapping or a request to do an Internet protocol address to host name mapping; and
wherein the network caching daemon caches host name to Internet protocol address mappings.

10. The data processing system of claim 9, wherein the network caching daemon hashes entries from a local file that stores host name to Internet protocol address mappings for the virtualized environment.

11. The data processing system of claim 10, wherein the local file consolidates all local files of the plurality of logical partitions.

12. The data processing system of claim 10, wherein if the second logical partition is configured to resolve the host a local way, the network caching daemon hashes the local file.

13. The data processing system of claim 9, wherein if the second logical partition is configured to resolve the host a non-local way, the network caching daemon searches answers in a cache file; and
wherein if the answer appears in the cache file, the network caching daemon returns the answer to the second logical partition.

14. The data processing system of claim 13, wherein if the answer does not appear in the cache file, the network caching daemon sends a request to a server through a network layer and caches an answer from the server in the cache file.

15. The data processing system of claim 9, wherein the first logical partition is a virtual input/output server partition.

16. A computer program product comprising a non-transitory computer useable medium having a computer readable program, wherein the computer readable program, when executed on a computing device, causes the computing device to:
configure a first logical partition within a plurality of logical partitions in a virtualized environment with a network caching daemon;
configure a second logical partition within the plurality of logical partitions within the virtualized environment with an address of the network caching daemon; and
responsive to a request to resolve a host from a network application running in the second partition, send the request to the address of the network caching daemon through a virtualization layer, wherein the request to resolve a host comprises a request to do a host name to Internet protocol address mapping or a request to do an Internet protocol address to host name mapping and wherein the network caching daemon caches host name to Internet protocol address mappings.

17. The computer program product of claim 16, wherein the network caching daemon hashes entries from a local file that stores host name to Internet protocol address mappings for the virtualized environment; and
if the second partition is configured to resolve the host a local way, hashing, by the network caching daemon, the local file.

18. The computer program product of claim 16, wherein the computer readable program further causes the computing device to:
if the second logical partition is configured to resolve the host a non-local way, search, by the network caching daemon, answers in a cache file; and
if the answer appears in the cache file, return the answer to the second logical partition.

19. The computer program product of claim 16, wherein the computer readable program comprises instructions that are stored in a computer readable storage medium in a data processing system, and wherein the instructions were downloaded over a network from a remote data processing system.

20. The computer program product of claim 16, wherein the computer readable program comprises instructions that are stored in a computer readable storage medium in a server data processing system, and wherein the instructions are downloaded over a network to a remote data processing system for use in a computer readable storage medium with the remote data processing system.

21. The method of claim 6, wherein the server is one of a network information services (NIS) server, a domain name system (DNS) server, or a lightweight directory access protocol (LDAP) server.

* * * * *